US012132650B1

(12) United States Patent
Bernardi et al.

(10) Patent No.: US 12,132,650 B1
(45) Date of Patent: Oct. 29, 2024

(54) MULTIPATH ROUTING IN NETWORK FABRICS WITH HARMONIC CONNECTIONS

(71) Applicant: Amazon Technologies, Inc., Seattle, WA (US)

(72) Inventors: Giacomo Bernardi, Bologna (IT); Ratul Mahajan, Seattle, WA (US); Saurabh Kumar, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/346,439

(22) Filed: Jul. 3, 2023

(51) Int. Cl.
*G06F 13/00* (2006.01)
*H04L 45/24* (2022.01)
*H04L 45/302* (2022.01)
*H04L 45/44* (2022.01)

(52) U.S. Cl.
CPC .......... *H04L 45/3065* (2013.01); *H04L 45/24* (2013.01); *H04L 45/44* (2013.01)

(58) Field of Classification Search
CPC ..... H04L 45/3065; H04L 45/24; H04L 45/44; H04L 43/3065
USPC ......................................... 709/238, 239, 241
See application file for complete search history.

(56) References Cited

U.S. PATENT DOCUMENTS

| 10,205,654 B2 * | 2/2019 | Choi ........................ H04L 45/24 |
| 2017/0078191 A1 * | 3/2017 | Choi ........................ H04L 45/54 |

OTHER PUBLICATIONS

Besta, M., et al., "Slim Fly: A Cost Effective Low-Diameter Network Topology," SC '14: Proc. of the International Conference for High Performance Computing, Networking, Storage and Analysis, Nov. 2014, 12 pages, URL: https://htor.inf.ethz.ch/publications/img/sf_sc_2014.pdf.
Flajslik, M., et al., "Megafly: A Topology for Exascale Systems," ISC High Performance 2018: High Performance Computing, 2018, pp. 289-310 (part of the book series: Lecture Notes in Computer Science, vol. 10876). URL: https://doi.org/10.1007/978-3-319-92040-5_15.
Guo, C., et al., "BCube: A High Performance, Server-centric Network Architecture for Modular Data Centers," ACM SIGCOMM Computer Communication Review, 2009, vol. 39(4), pp. 63-74.
Jouppi, N. P., et al., "TPU v4: An Optically Reconfigurable Supercomputer for Machine Learning with Hardware Support for Embeddings," arXiv:2304.01433v3 [cs.AR], Apr. 20, 2023, pp. 1-14, URL: https://arxiv.org/abs/2304.01433v3.
Kim, J., et al., "Technology-Driven, Highly-Scalable Dragonfly Topology," ACM SIGARCH Computer Architecture News, Jun. 2008, vol. 36(3), pp. 77-88.

(Continued)

*Primary Examiner* — Kenneth R Coulter
(74) *Attorney, Agent, or Firm* — Weaver Austin Villeneuve & Sampson LLP

(57) ABSTRACT

Network traffic between a source node and a destination node in a network fabric can be routed by distributing the network traffic from the source node to a set of one-hop neighbors of the source node. Each one-hop neighbor of the source node can be set as a first waypoint. A one-hop neighbor of the destination node mapped to the corresponding one-hop neighbor of the source node is identified and set as a second waypoint. The distributed traffic is then routed from the first waypoint to the second waypoint via a network fabric having network nodes connected according to harmonics.

20 Claims, 14 Drawing Sheets

(56) References Cited

OTHER PUBLICATIONS

Matsuoka, S., "You Don't Really Need Big Fat Switches Anymore—Almost," IPSJ SIG Technical Report [Japan], Aug. 2003, pp. 157-162, URL: https://ipsj.ixsq.nii.ac.jp/ej/?action=repository_uri&item_id=23400&file_id=1&file_no=1.

Shpiner, A., et al., "Dragonfly+: Low Cost Topology for Scaling Datacenters," 2017 IEEE 3rd International Workshop on High-Performance Interconnection Networks in the Exascale and Big-Data Era (HiPINEB), Feb. 2017, 8 pages, URL: https://www.researchgate.net/publication/313341364_Dragonfly_Low_Cost_Topology_for_Scaling_Datacenters.

Singla, A., et al., "Jellyfish: Networking Data Centers Randomly," NSDI'12: Proc. of the 9th USENIX Conference on Networked Systems Design and Implementation, Apr. 2012, pp. 1-14, URL: https://www.usenix.org/system/files/conference/nsdi12/nsdi12-final82.pdf.

U.S. Appl. No. 18/346,436, inventors Bernardi G, et al., filed Jul. 3, 2023.

U.S. Appl. No. 18/346,441, inventors Bernardi G, et al., filed Jul. 3, 2023.

Valadarsky, A., et al., "Xpander: Towards Optimal-Performance Datacenters," CoNEXT '16: Proc. of the 12th International Conference on Emerging Networking Experiments and Technologies, Dec. 2016, pp. 205-219.

\* cited by examiner

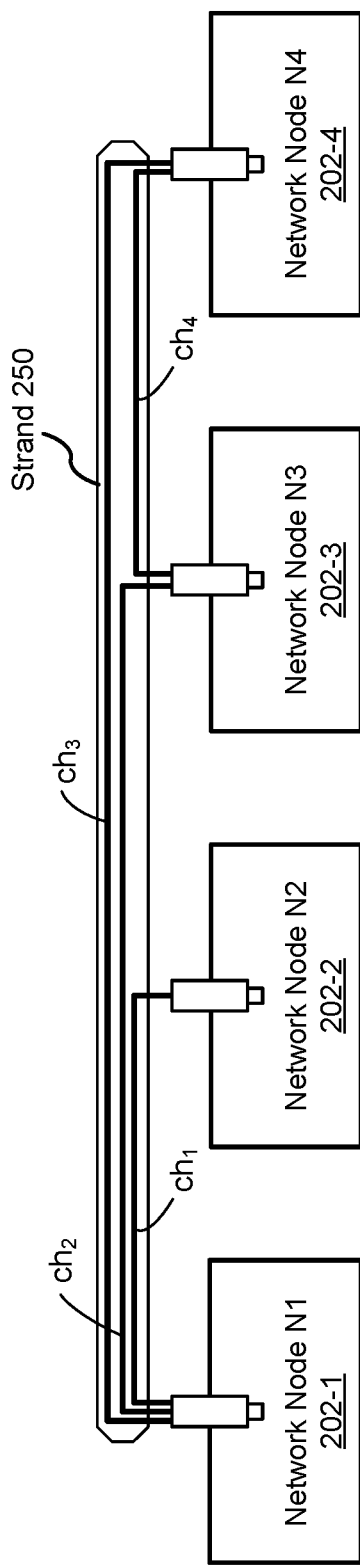
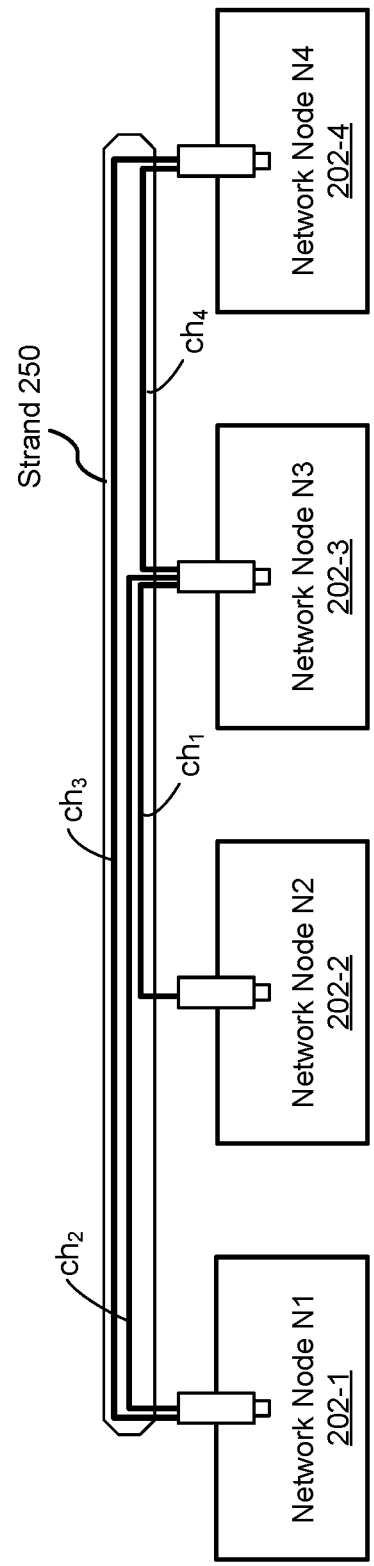
FIG. 2A
FIG. 2B

MULTIPATH ROUTING IN NETWORK FABRICS WITH HARMONIC CONNECTIONS

BACKGROUND

Server computers such as those supporting cloud computing services are maintained in facilities commonly referred to as data centers. A small data center may occupy a room or a floor of a building, while a large data center may occupy several floors or an entire building. A typical data center may house thousands of servers that communicate with each other via a network. The computing workload demanded from data centers have increased dramatically to serve computationally intensive applications such as large machine learning models. As such, data centers are expanding in size and numbers to meet the increase in workload demands.

BRIEF DESCRIPTION OF THE DRAWINGS

Various embodiments in accordance with the present disclosure will be described with reference to the drawings, in which:

FIG. 2A illustrates an example of a strand with reconfigurable channels connecting network nodes, according to certain aspects of the disclosure;

FIG. 2B illustrates an example of reconfiguring a channel of the strand of FIG. 2A, according to certain aspects of the disclosure;

DETAILED DESCRIPTION

Figure 1:
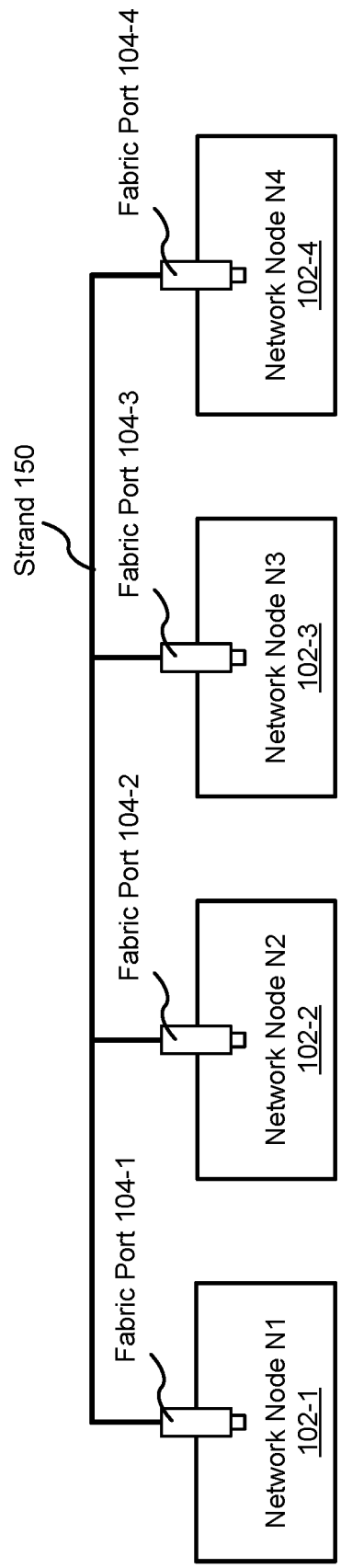
FIG. 1 illustrates an example of a strand connecting network nodes (e.g., routing devices), according to certain aspects of the disclosure.

To support the expansion of data centers, the network infrastructure interconnecting the data center has to scale with the number of server computers. A multilayer network fabric such as a Fat Tree topology or other variations of Clos topologies have been popular due to their flexibility and non-blocking nature. However, such topologies may not scale linearly with the number of server racks due to the addition of spine switches and intermediate switching layers between Top-of-Rack switches and spine switches. The excess equipment also increases power consumption. This makes scaling Clos topologies beyond a mega data center expensive in terms of the need for additional network devices and overall power consumption.

The techniques disclosed herein provide a network architecture that uses a single connection layer to interconnect network nodes in a computer network. For example, a computer network implemented in a data center may include multiple network nodes organized as a logical grid. Each network node can be associated with a server rack, and each logical column of network nodes may correspond to an aisle or other grouping of server racks. Each network node can be implemented, for example, using a routing device coupled to the servers in the server rack. The network nodes can be interconnected with each other using strands (e.g., a small optical network) implemented with multipoint optical technologies that provide optical paths between the network nodes.

For example, each network node can be coupled to network nodes in the same column (e.g., on the same aisle) using a set of vertical strands, and coupled to network nodes in the same row using a set of horizontal strands. Each strand (e.g., horizontal strand, vertical strand) can connect up to a maximum allowable number of network nodes per strand (e.g., at least four or five or more network nodes per strand). The maximum allowable number of network nodes per strand can depend on the number of optical channels (e.g., number of physical paths or number of wavelength-dependent paths) a strand can support. The number of strands connected to each network node can depend on the number of fabric ports (network-facing ports) available on the network node. For example, a routing device with sixteen fabric ports can be connected to eight horizontal strands and eight vertical strands.

Each horizontal strand connects network nodes in the same row according to a horizontal harmonic that specifies the distance between adjacent connection points on the horizontal strand. The horizontal harmonic distance is given in terms of the number of network nodes along the row between adjacent connection points. Each horizontal harmonic can be different than other horizontal harmonics in the set of horizontal strands. Similarly, each vertical strand connects network nodes along the same column according to a vertical harmonic that specifies the distance between adjacent connection points on the vertical strand. The vertical harmonic distance is given in terms of the number of network nodes along the column between adjacent connection points. Each vertical harmonic can be different than other vertical harmonics in the set of vertical strands connected to a network node. The distance specified by the harmonics can also be referred to as a node distance.

By setting the harmonics based on number of network nodes in the rows and columns of the logical grid, and leveraging the multipoint nature of the strands, any two server racks can usually be reachable within three switching hops. Congestion can also be avoided by spreading network load across many paths. The single connection layer topology also reduces the number of active network devices and total power consumption as compared to Clos topologies. Hence, as data centers continue to expand and scale up, the network architecture with the harmonic connections disclosed herein can scale linearly with the number of server racks.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 shows a conceptual diagram of an example of a strand connecting network nodes. A strand may refer to an optical path connecting fabric ports of network nodes in a network. In FIG. 1, four network nodes (network node N1 102-1, network node N1 102-2, network node N1 102-3, and network node N1 102-4) can be connected onto a strand 150 using multipoint optical technology. Each network node can be implemented, for example, using a routing device such as a router or a switch, and can be coupled to a server rack. Although each network node in FIG. 1 is shown with one fabric port, each network node may include any number of server-facing ports (may also be referred to as server ports) and any number of fabric ports. The server ports are ports that connect to one or more servers and/or to one or more other networks (e.g., other data centers, external networks, etc.). The fabric ports are ports that connect to the network fabric. Each fabric port implements an optical ingress/egress path from the network node to other network nodes in the network fabric.

The connection between two fabric ports along a strand can be referred to as a link, and each link can be implemented as a symmetric pair for ingress/egress. The set of fabric ports belonging to different network nodes that are connected to the same strand can be referred to as a pool. Fabric ports of the same pool can communicate with each other via the strand. Hence, fabric port 104-1, fabric port 104-2, fabric port 104-3, and fabric port 104-4 can each communicate with each other via strand 150. A strand may support connections for up to a maximum allowable network nodes per strand. In some implementations, the allowable network nodes per strand can be a configurable parameter, and/or depend on the implementation of the strand (e.g., number of channels and/or wavelengths supported by the strand).

FIGS. 2A-2B show a conceptual diagram of an example of a strand connecting network nodes using reconfigurable multipoint optical technology. Fabric ports from different routers attached to a strand can simultaneously communicate with each other (multipoint connectivity) within the bounds of the maximum port bandwidth. The bandwidth allocated to each port pair can be reconfigured in fixed increments, and the bandwidth allocated to a specific port pair is independent of that allocated to another port pair on the same strand, as long as the maximum bandwidth limit of any port is not violated.

Referring to FIG. 2A, four network nodes (network node N1 202-1, network node N1 202-2, network node N1 202-3, and network node N1 202-4) can be connected onto a strand 250 using reconfigurable multipoint optical technology. Capacity can be dynamically allocated between any pair of network nodes on strand 250. For example, strand 250 may support up to four channels $ch_1$, $ch_2$, $ch_3$, and $ch_4$ as shown. A channel may refer to an indivisible unit of capacity allocated between a pair of fabric ports along a strand. In some implementations, the multiple channels supported by a strand can be implemented using respective optical wavelengths or subcarriers. For example, channel $ch_1$ can be implemented using wavelength $\lambda_1$, channel $ch_2$ can be implemented using wavelength $\lambda_2$, channel $ch_3$ can be implemented using wavelength $\lambda_3$, and channel $ch_4$ can be implemented using wavelength $\lambda4$.

In the example of FIG. 2A, channel $ch_2$ connects network node N1 202-1 to network node N3 202-3, and bypasses network node N2 202-2 without adding any switching delay. More generally, by leveraging multipoint connectivity, a network node on a strand can reach any other network node on the same strand without incurring an extra hop. When traffic demands change, the capacity allocations can be adapted, for example, by moving one or more channels between the network nodes connected to the strand. For example, as the traffic demand between network node N2 202-2 and network node N3 202-3 increases, channel $ch_1$ can be reallocated from connecting network node N1 202-1 with network node N2 202-2 as shown in FIG. 2A to connecting network node N2 202-2 with network node N3 202-3 as shown in FIG. 2B.

Figure 3:
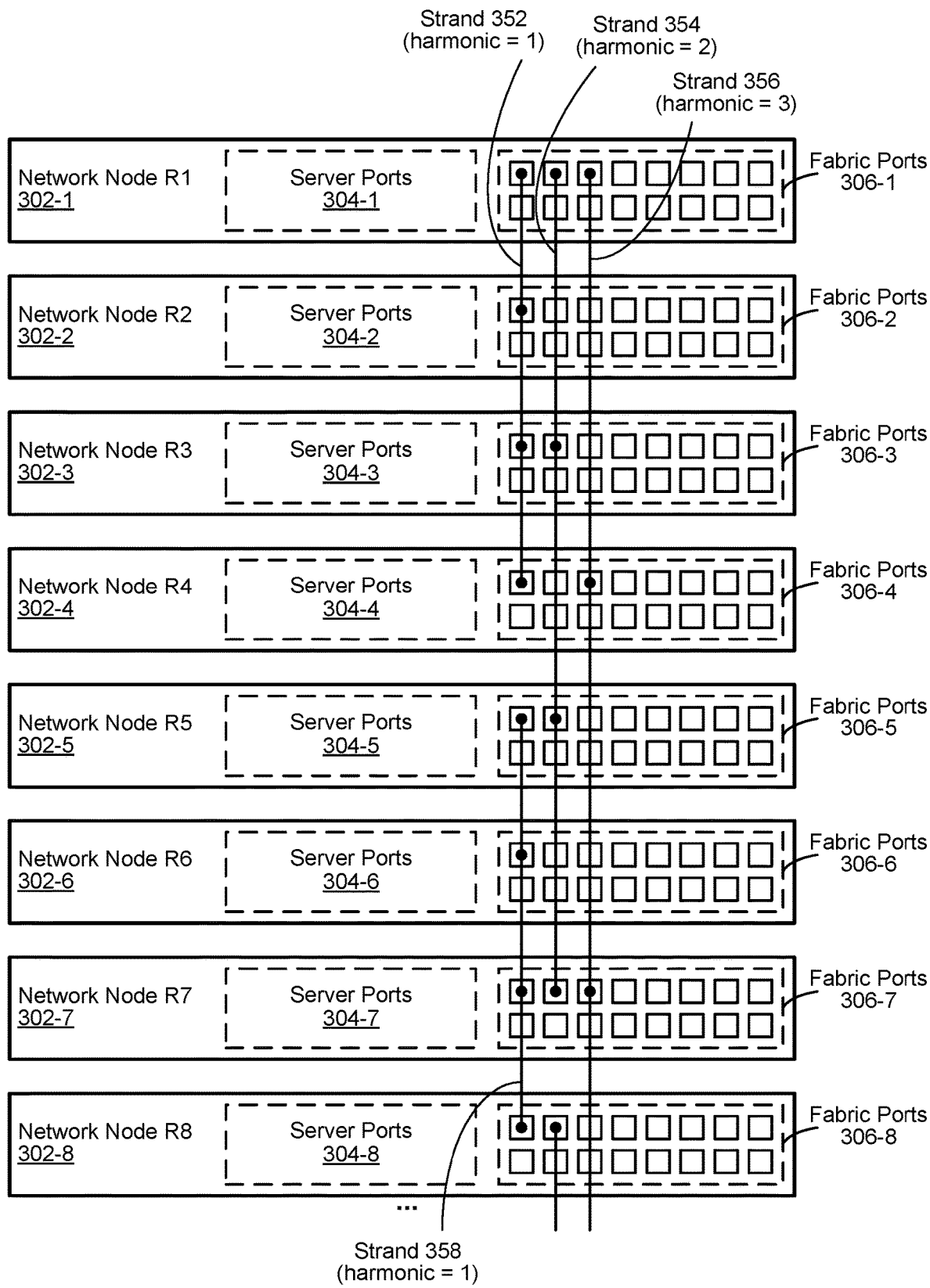
FIG. 3 illustrates an example of harmonic connections between network nodes, according to certain aspects of the disclosure.

FIG. 3 illustrates an example of network nodes connected by strands. Each of network nodes R1 to R8 302-1 to 302-8 can be implemented using a network device (e.g., routing device) in the network fabric. Each of network nodes R1 to R8 302-1 to 302-8 can be coupled to a respective server rack to provide connectivity between the servers in the rack and the network fabric. Each network node has multiple connection ports to provide bandwidth capacity for the network node. The connection ports may include a number of fabric ports, and a number of server ports (e.g., point-to-point server-facing ports). For instance, network node R1 302-1 may have a set of server ports 304-1 (individual ports not shown) and a set of fabric ports 306-1. At least half of the bandwidth capacity of the network node can be allocated to the fabric ports. In a specific example, network node R1 302-1 may have 16×1.6 Tbps fabric ports for 25.6 Tbps fabric capacity, and 32×800 Gbps server ports for 25.6 Tbps server capacity to provide a 50/50 split of the bandwidth capacity of the network node between fabric/server capacity. In some implementations, the bandwidth allocation can provide more than half of the bandwidth capacity of the network node to the fabric ports to connect to the network fabric. For example, a network node may implement a 80/20 split between fabric/server capacity. Shifting more capacity to the network fabric can lower the hop count between pairs of source/destination network nodes. It can also result in increased fabric capacity.

Network nodes R1 to R8 302-1 to 302-8 can be interconnected on the fabric ports in a particular pattern referred to as harmonics. A harmonic specifies the distance in terms of the number of network nodes between adjacent connection points on a strand. For example, strand 352 has a harmonic of 1 because the connection points of strand 352 are at a distance of one network node apart. Hence, strand 352 connects network node R1 302-1 to network node R2 302-2 to network node R3 302-3 to network node R4 302-4. In the example shown, each strand has a maximum pool of four network nodes, and thus up to four network nodes are connected to a strand. Strand 358 also has a harmonic of 1, and connects network node R5 302-5 to network node R6 302-6 to network node R7 302-7 to network node R8 302-8.

As another example, strand 354 has a harmonic of 2 because the connection points of strand 354 are at a distance of two network nodes apart. Hence, strand 354 connects network node R1 302-1 to network node R3 302-3 to network node R5 302-5 to network node R7 302-7. As a further example, strand 356 has a harmonic of 3 because the connection points of strand 356 are at a distance of three network nodes apart. Hence, strand 356 connects network node R1 302-1 to network node R4 302-4 to network node R7 302-7 and to the tenth network node (not shown).

By allowing for weighted-cost multipathing (WCMP) and intermediate-hop-routing, the number of paths between pairs of network nodes can be controlled. For example, network node R1 302-1 can reach network node R3 302-3 via the path along strand 354 or via the path along strand 352. As another example, network node R1 302-1 can reach network node R5 302-5 via the path along strand 354, but also via strand 356 to network node R7 302-7 and then via strand 354 from network node R7 302-7 to network node R5 302-5. Additionally, by using multipoint connectivity, hop counts can be kept low. For example, network node R1 302-1 can reach network node R5 302-5 along strand 354 without incurring a hop on network node R3 302-3 by leveraging the multipoint connectivity.

It should be noted that although only three fabric ports are connected on each network node in FIG. 3, a network fabric can be more densely wired such that additional or all fabric ports on a network node are each connected to a strand. When applied to a floorplan of a data center having, for example, an array of server racks arranged in rows and columns, half of the occupied fabric ports on a network node can be allocated for horizontal strands (connections along rows) and half of the occupied fabric ports can be allocated for vertical strands (connections along columns). In some implementations, the allocation of fabric ports to vertical and horizontal strands can be adjusted based on the aspect ratio of the floorplan array (e.g., to match or approximate the ratio of columns to rows).

Each of network nodes R1 to R8 302-1 to 302-8 can also include processing logic to carry out functions of the network node. The processing logic can be implemented, for example, using one or more of application specific integrated circuit (ASIC), field programmable gate array (FPGA), network processing unit (NPU), processor, or system-on-chip (SoC). For example, the processing logic can be operable to distribute traffic for a destination node to network nodes along corresponding strands of the fabric ports, and the traffic can be routed to the destination node via the network fabric. In some implementations, the processing logic can also be operable to transmit traffic demand information of ingress traffic and egress traffic of the network node to a control plane, receive channel allocation information from the control plane based on the traffic demand information, and configure the reconfigurable multipoint optical connections with the channel allocation information.

Figure 4A:
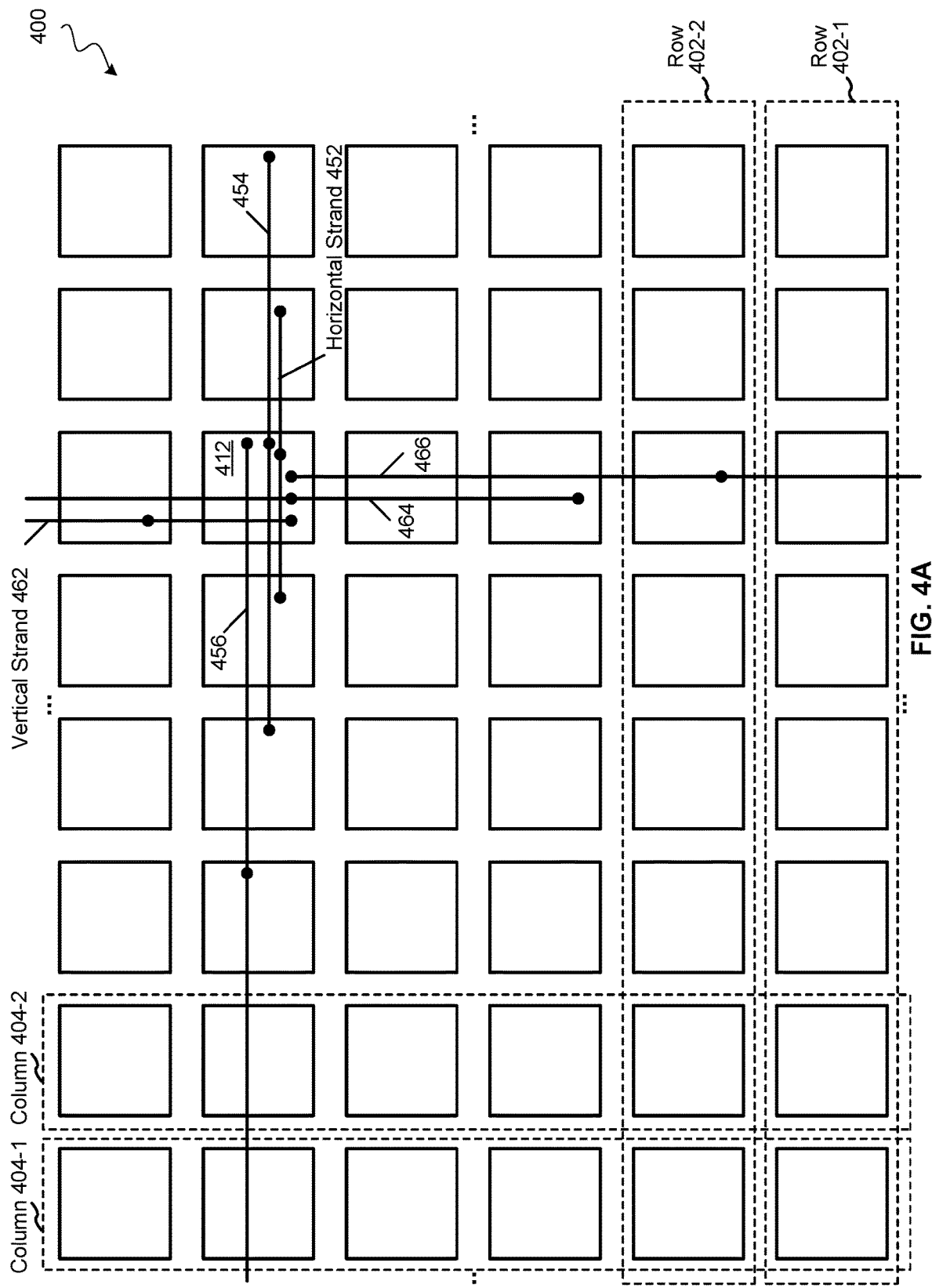
FIG. 4A illustrates an example of network nodes in a data center, according to certain aspects of the disclosure.

FIG. 4A illustrates an example of a collection of network nodes. In FIG. 4, each square can represent a server rack, which may include one or more server computers and a network device operating as a network node. Each network node or network device can be implemented, for example, using a routing device, a switch, or other types of network device capable of sending and receiving network traffic. The collection of network nodes 400 can form a logical grid. For example, each network node can be assigned an identifier that can translate to an array index representing a logical row and logical column that the network node belongs to.

In some implementations, the collection of network nodes 400 can be physically arranged as an array of rows and columns of network nodes in the layout of the floorplan of a data center as shown. Referring to FIG. 4A, the array of network nodes may include row 402-1, row 402-2, etc.; and column 404-1, column 404-2, etc. Each column may correspond to an aisle of server racks in a data center. Although only 48 network nodes are shown, it should be understood that the number of network nodes can extend beyond what is shown as indicated by the ellipses.

In other implementations, the logical grid of network nodes can be physically arranged in a different formation, and the physical arrangement need not necessarily be a rectangular or square layout. It should be understood that use of the terms grid, array, row(s), and column(s) refer a logical organization of the network nodes, and not necessarily to the physical arrangement of the network nodes, though the logical organization can be implemented using a physical grid or array.

In FIG. 4A, each network node may utilize six fabric ports for connectivity to the network fabric to connect the server rack to other server racks. Three of the fabric ports on the network node can be allocated for strands connecting network nodes along the same row (e.g., in the horizontal direction), and three of the fabric ports can be allocated for strands connecting network nodes along the same column (e.g., in the vertical direction). A strand connecting network nodes along the same row may be referred to as a horizontal strand, and a strand connecting network nodes along the same column may be referred to as a vertical strand. Hence, in the example shown, the set of horizontal strands connected to a network node has the same number of strands as the set of vertical strands.

By way of example, the horizontal strands may have respective horizontal harmonics of 1, 2, and 3. Collectively, the harmonics of respective strands connecting network nodes in the same row can be referred to as the horizontal harmonic set. Referring to network node 412 and the strands connected to its fabric ports, strand 452 is a horizontal strand with a harmonic of 1 to connect network nodes at a distance of one network node apart in the row direction. In the example shown, the maximum number of network nodes per strand is three. Strand 454 is a horizontal strand with a harmonic of 2 to connect network nodes at a distance of two network nodes apart in the row direction. Strand 456 is a horizontal strand with a harmonic of 3 to connect network nodes at a distance of three network nodes apart in the row direction.

The vertical strands may have respective vertical harmonics of 1, 2, and 3. Collectively, the harmonics of respective strands connecting network nodes along the same column can be referred to as the vertical harmonic set. Referring again to network node 412 and the strands connected to its fabric ports, strand 462 is a vertical strand with a harmonic of 1 to connect network nodes at a distance of one network node apart in the column or aisle direction. Strand 464 is a vertical strand with a harmonic of 2 to connect network nodes at a distance of two network nodes apart in the column or aisle direction. Strand 466 is a vertical strand with a harmonic of 3 to connect network nodes at a distance of three network nodes apart in the column or aisle direction.

In the example shown, the vertical harmonic set is the same as the horizontal harmonic set. However, the two harmonic sets need not have the same set of values. For example, one harmonic set may include one or more harmonics that are not in the other harmonic set, and/or vice versa. Moreover, although in the example shown, the number of harmonics is the same in both sets, the number of harmonics in each set can differ, and the number of horizontal strands connected to a network node can be different than the number of vertical strands. In general, half of the fabric ports of a network node can be allocated to the horizontal strands and the other half of the fabric ports can be allocated to the vertical strands. However, the number of fabric ports allocated to the horizontal strands can be different than that for the vertical strands. For example, the fabric ports can be allocated to the horizontal/vertical strands in a manner to match or approximate the aspect ratio of the logical grid.

Figure 4B:
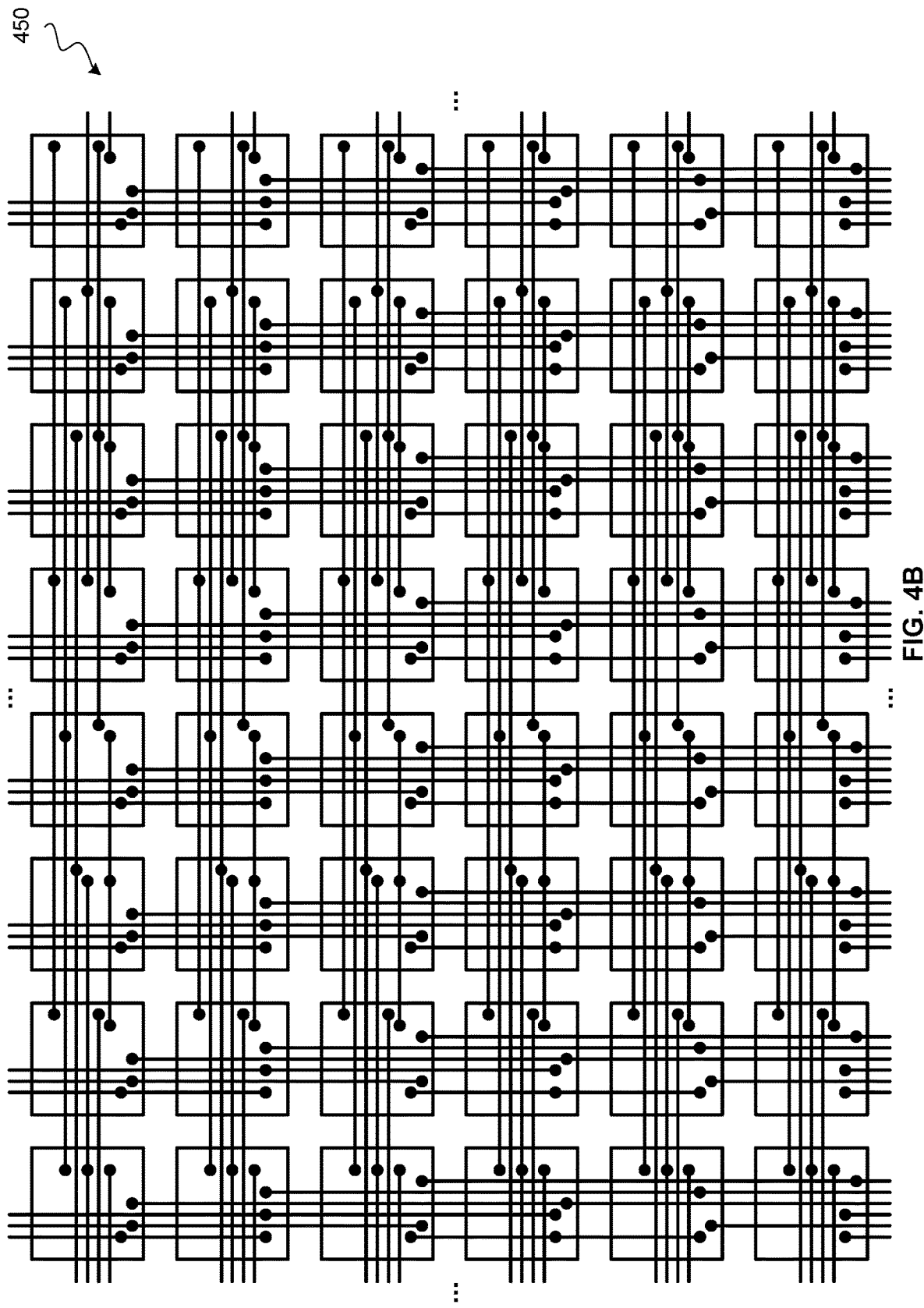
FIG. 4B illustrates an example of harmonic connections between network nodes in a data center, according to certain aspects of the disclosure.

FIG. 4B illustrates an example of a network fabric 450 created by extending the harmonic connections described above with reference to network node 412 to every network node in the collection of network nodes 400. Each network node can include three fabric ports connected to respective horizontal strands according to the horizontal harmonic set of [1, 2, 3] (e.g., along the row direction), and three fabric ports connected to respective vertical strands according to the vertical harmonic set of [1, 2, 3] (e.g., along the column or aisle direction). Each strand connects three network nodes.

More densely wired network fabrics can be created by utilizing all available fabric ports. For example, with sixteen available fabric ports on a network node, harmonic sets of eight harmonics each can be implemented in the row (e.g., horizontal) and column (e.g., vertical) directions. The particular values selected for the harmonics can be based on the number of network nodes in a row (e.g., row size) and/or the number of network nodes in a column (e.g., column size). To minimize the hop count, the largest harmonic can be chosen such that a corresponding strand can span at least the entire length of the grid dimension. In other words, the set of horizontal strands can have a horizontal strand that spans at least the full length of the row, and/or the set of vertical strands can have a vertical strand that spans at least the full length of the column. A strand extending beyond the length of the row/column can wrap around at the end of the row/column, and connect to the next network node from the beginning of the row/column based on the harmonic distance.

Avoiding harmonics that are multiples of other smaller harmonics (aside from 1) can add more diversity to the network nodes that a given network node can connect to. Hence, in some implementations, prime numbers are selected or prioritized over non-prim numbers for the harmonics. In some implementations, each horizontal harmonic and each vertical harmonic can be a prime number (e.g., the values 1 and 2 can be considered prime numbers). In other implementations, non-prime numbers can also be used, but the set of horizontal harmonics preferably includes at least one prime number that is larger than 2, and the set of vertical harmonics preferably includes at least one prime number that is larger than 2. Spreading out the harmonics between 1 and the maximum harmonic can also lower the worst-case hop count. Hence, if there are more than enough prime numbers between 1 and the maximum harmonic, the prime numbers selected for the harmonics can be chosen to maximize the difference between adjacent harmonics.

In some implementations the largest harmonic in a harmonic set can be selected as the largest prime number that is less than half of the number of network nodes along the strand direction. For example, for a row of 40 network nodes, the largest harmonic can be 19, which is the largest prime number that is less than half of the number of network nodes along the row, which is 20. With a maximum harmonic of 19, a harmonic set of all prime numbers of [1, 3, 5, 7, 11, 13, 17, and 19] can be implemented. Using such a technique, the typical hop count from any point in the network fabric to another point in the network fabric has be found to be three hops, with the worst cases being usually five hops.

It should be noted that given a maximum harmonic, if there are an insufficient number of prime numbers within the range, multiples of another harmonic can be used for a strand such that all available fabric ports are utilized. In some implementations, if a strand reaches the end of a row or a column, for example, and the strand has not exhausted the maximum allowable connections, the strand can wrap around to the beginning of the row or column to connect to the next network node at the harmonic distance. In some implementations, the available fabric capacity on a network device can be spread evenly between the strands. In some implementations, strands with larger harmonics can be allocated more capacity than strands with lower harmonics. It should also be noted that the harmonics within a set of horizontal or vertical harmonics need not all be different, and one or more harmonics in the set can be a repeated value such that multiple strands along a direction are connected at the same harmonic.

Figure 5:
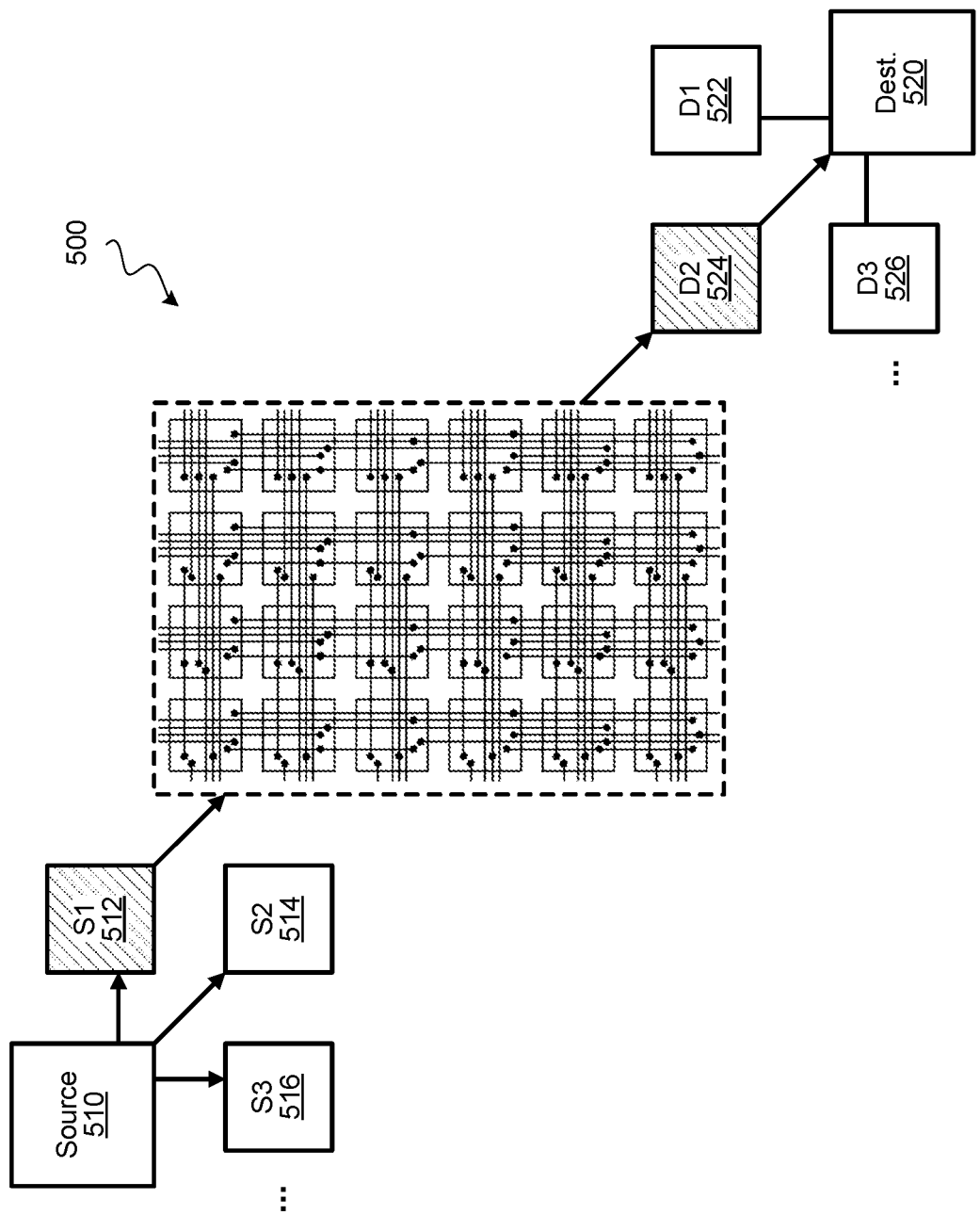
FIG. 5 illustrates an example of routing traffic between a source and a destination, according to certain aspects of the disclosure.

FIG. 5 illustrates a conceptual diagram of routing traffic between a source and a destination in the network fabric. Network fabric 500 can be, for example, network fabric 450 or other networks having harmonic connections. Source 510 can be any one of the network nodes in network fabric 500, and destination 520 can be any other network node in network fabric 500. To send traffic from source 510 to destination 520 according to flow-level hashing (e.g., five-tuple hashing), the traffic can be spread to the one-hop neighbors of source 510 such as network node S1 512, network node S2 514, network node S3 516, and so on. By way of example, for a network node with 16 fabric ports and strands that each connects up to four network nodes, source 510 can have 48 one-hop neighbors by leveraging multipoint connectivity, because each fabric port can connect to three other network nodes (one-hop neighbors). The traffic can be sprayed to all of the one-hop neighbors of source 510, or to a configurable number of the one-hop neighbors.

Each of the one-hop neighbors receiving traffic from source 510 becomes a first waypoint for the traffic distributed to that one-hop neighbor. Given a one-hop neighbor of source 510, a corresponding one-hop neighbor of destination 520 is selected as a second waypoint for the traffic distributed to that one-hop neighbor of source 510. For example, destination 520 may have one-hop neighbors including network node D1 522, network node D2 524, network node D3 526, and so on. Network node D2 524 can be selected as the waypoint for the traffic distributed from source 510 to network node S1 512. With network node S1 512 and network node D1 524 set as waypoints for the path, the traffic between the two waypoints can be routed through network fabric 500 based on the shortest path between the waypoints. In some implementations, if there are multiple shortest paths between the two waypoints, the traffic can be routed using multi-path routing between the two waypoints. In implementations in which the capacity between links can be dynamically adjusted, the traffic can be routed using shortest path or equal cost multi-path (ECMP) routing for traffic demands below a threshold. For traffic demands at or above the threshold, the routing can be optimized using weighted cost multi-path (WCMP) routing.

In some implementations, a logically centralized control plane can be used to manage the traffic in the network fabric. The control plane may receive telemetry flow data from the network nodes, and can maintain an up-to-date traffic demand matrix (traffic quantity between pairs of network nodes). The traffic demand matrix contains traffic information (e.g., in Gbps) for each possible pair of network nodes in the network fabric. For example, sources can be placed on the y-axis, and destinations can be placed on the x-axis. The diagonal cells of the traffic demand matrix corresponding to the source and destination being the same network node can be null. The sum of each row corresponds to the total egress traffic from the network node associated with that row, and the sum of each column corresponds to the total ingress traffic to the network node associated with that column.

In some implementations, the traffic demand can be characterized using an average, median, or peak traffic between network nodes over a measurement interval. The traffic demand can also be a running average over a set of prior measurement intervals, or a weighted average that is more heavily weighted for recent measurement intervals. Historic traffic patterns can also be considered when updating the traffic demand matrix (e.g., accumulated average over the same measurement interval in the day over past days). Using the traffic demand matrix as an input, the control plane can periodically execute an optimizer to determine how traffic are carried in the network fabric. In some implementations, the optimization can be performed for traffic demands at or above a threshold (e.g., 1 Gbps) using WCMP across a larger, configurable number of paths (e.g., set of edge disjoint paths), whereas traffic demands below the threshold can use ECMP across shortest paths without the optimizer. The optimizer can be used to maximize available capacity on the most saturated link (e.g., to provide headroom or excess capacity to accommodate unanticipated demand).

To control how the traffic demand is routed across the network fabric, the control plane may make decisions on: (1) number of channels to allocate between network nodes on a strand; (2) paths along which traffic for pairs of source-destination network nodes is spread; and (3) relative weights of those paths. These decisions can be made in two phases. In the offline phase, which can be executed at a periodic interval (e.g., executed every hour), the control plane can compute the channel allocation for the strands and sets of disjoint paths between each pair of network nodes. The past demand can provide an indicator for the expected demand for the next interval. By default, source network nodes may spread traffic equally (flow-level hashing) along these paths.

In the online phase, which can be executed at a more frequent interval (e.g., executed every few minutes), network node pairs that are transmitting at a rate higher than a threshold can be identified, and the relative weight for each path between the pair can be optimized with fixed channel allocation. This computation accounts for traffic that will continue to be spread equally across paths. This can maximize the minimum headroom available on any link to accommodate bursts and unexpected traffic increases between routers.

In some implementations, the optimizer can be implemented in the control plane using a linear programming solver (e.g., mixed integer linear programming (MILP) or integer linear programming (ILP) solver), depending on the objective function. Given a traffic demand matrix and wiring topology (which network nodes connect to which other network nodes according to harmonics), the channel allocation and forwarding paths can be computed by the optimizer. All demands of the traffic demand matrix are routed, based on the objective function (e.g., minimizing maximum link utilization).

The inputs to the optimizer may include:
Demand matrix:
  $\{d_{ij}\}$: Set of traffic demands from $router_i$ to $router_j$ (Gbps)

Figure 6:
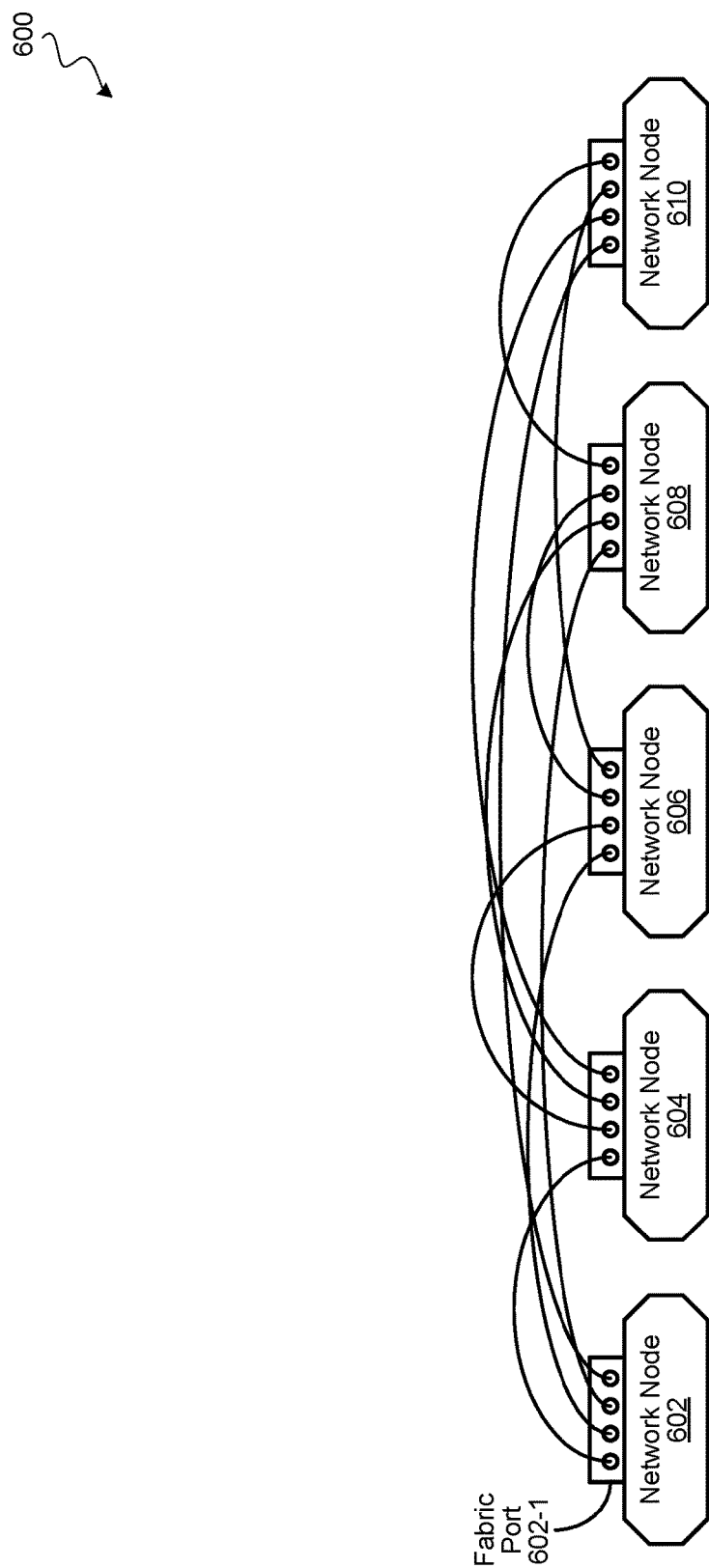
FIG. 6 illustrates a first example implementation of a strand, according to certain aspects of the disclosure.

Encoding the physical topology (wiring):
  $L_x=[r_k]$: List of routers that connect to $fiber_x$
Encoding valid paths for a demand (to control stretch):
  $P_{ij}=\{p_a, \ldots\}$, where $p_a[l_{xkl}]$(path is a list of links)
Other constants based on the strand implementation/topology:
  N: Maximum number of channels that can exist on a fiber
  C: Capacity of each channel (Gbps)
The outputs of the optimizer may include:
Allocation of channels (yields a logical link made up of possibly multiple channels)
  $n_{xkl}$: Number of channels allocated to link $l_{xkl}$
How demand is carried
  $f_{ij,a}$: Portion of demand $d_{ij}$ that is carried on path $p_a$ (Gbps)
The set of constraints for the optimizer may include:
Channel allocation (two models can be used):
  Model 1, Fiber-level: Total number of channels on each fiber must equal N
    $\forall x$
    $\Sigma\{k,l|r_k \in L_x, rl \in L_x, k<l\} n_{xkl}=N$(k<l ensures that each direction is counted only once)
  Model 2, Pori-level: Total incoming and outgoing per attached port is fixed
    $\forall x$
    $\forall k$ where $r_k \in L_x$: $\Sigma\{l|rl \in L_x\} n_{xkl}=N$(outgoing limit)
    $\forall l$ where $r_l \in L_x$: $\Sigma\{l|rk \in L_x\} n_{xkl}=N$ (inbound limit)
All demand is allocated
  $\forall k, l$ where $r_k \in L_x r_l \in L_x t, k<l$: $n_{xlk}=n_{xlk}$.
  $\forall \forall i,j$
  $\Sigma\{a|p_a \in P_{ij}\} f_{ij,a}=d_{ij}$
Capacity constraints:
  $\forall x, k, l$ where $r_k \in L_x, r_l \in L_x, k=l$;
    $u_{xkl}=\Sigma\{i,j,a|p_a \in P_{ij}, l_{xkl} \in p_a\} f_{ij,a} l$ (total traffic carried by the link for all paths it is part of)
    $u_{xkl}<=n_{xkl} \times C$ (should be less than capacity)
The objective function for the optimizer can be based on one or more of utilization, headroom (to provide excess capacity), latency, and/or redundancy (to provide duplicate paths) of links between the connection points. Examples of the objective function that can be used include:
Minimize maximum utilization (non-linear).
  minimize $\max_{xkl}(u_{xkl}/(n_{xkl} \times C)$
Maximize minimum headroom on a link (linear).
  maximize $\min_{xkl}((n_{xkl} \times C) - u_{kxl})$ FIG. 6 illustrates a first example implementation of a strand in which multipoint optical connections are implemented with breakout optics (e.g., DR4 optics) to connect a fabric port of a network node to fabric ports of respective network nodes along the strand. In the example shown, strand 600 connects five network nodes 602, 604, 606, 608, and 610. Each of the network nodes can be implemented, for example, using a routing device, switch, or other types of network device capable of directing network traffic. Network node 602 may include multiple fabric ports including fabric port 602-1. For example, although only one fabric port is shown, network node 602 may include eight, sixteen, thirty-two, or other number of fabric ports to connect to other strands. Network node 602 may also include multiple server ports for connecting to servers or other networks. The other network nodes can have a similar configuration as network node 602.

Fabric port 602-1 can be a parallel-single-mode style port, and can be implemented, for example, using a DR4 optical transceiver to provide four breakout channels. Hence, each fabric port can connect to four other network nodes. It should be noted that each channel is a duplex channel with a receive channel and a transmit channel. Strand 600 provides multipoint connectivity, but at fixed bandwidth between port pairs (e.g., bandwidth may not be reconfigurable or may not be incremented/decremented). A network fabric built using strand 600 can be routed, for example, using shortest path or ECMP. Because the bandwidth between port pairs is fixed, optimizations by the control plane to reallocate channel capacity can be omitted.

Figure 7:
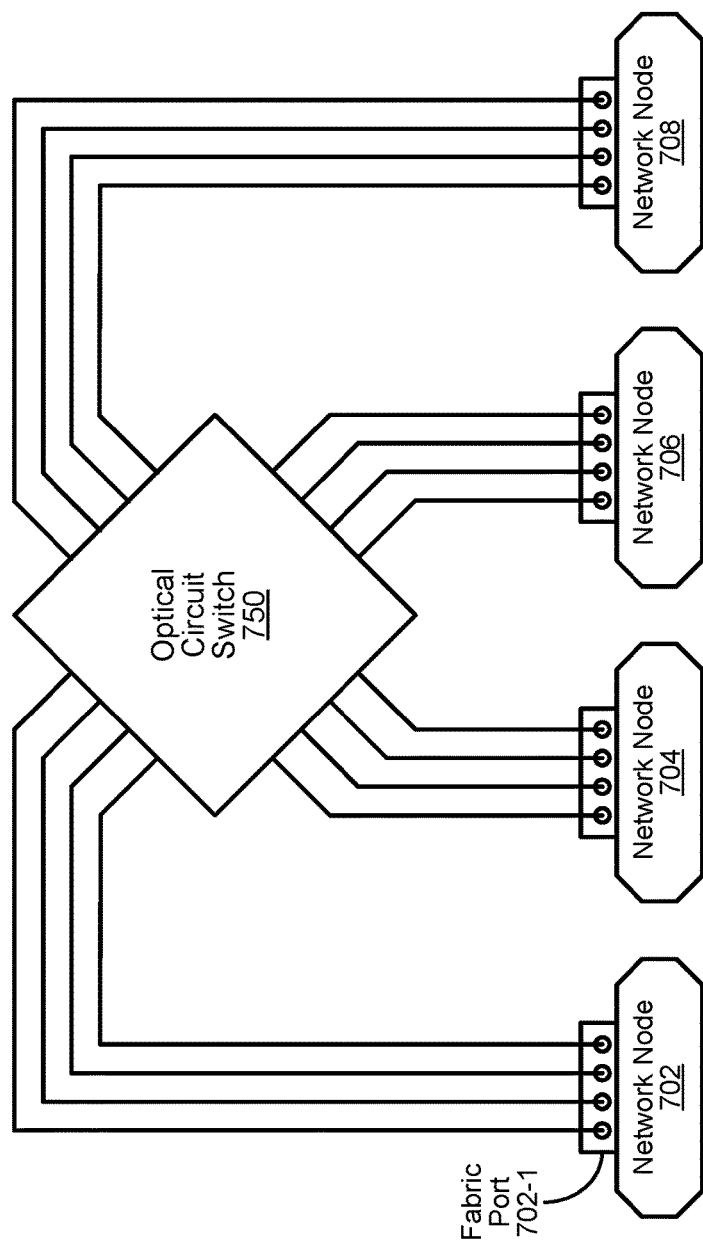
FIG. 7 illustrates a second example implementation of a strand, according to certain aspects of the disclosure.

FIG. 7 illustrates a second example implementation of a strand in which reconfigurable multipoint optical connections are implementing with breakout optics (e.g., DR4 optics) to connect a fabric port of the network node to multiple ports of an optical circuit switch that is connected to other network nodes along the strand. In the example shown, strand 700 connects four network nodes 702, 704, 706, and 708. Although only one fabric port 702-1 is shown for network node 702, each network node may include multiple fabric ports to connect to other strands. Fabric port 702-1 can be a parallel-single-mode style port, and can be implemented, for example, using a DR4 optical transceiver to provide four breakout duplex channels. The breakout fibers from the fiber port of each network node can be connected to an optical circuit switch (OCS) 750 to form a capacity pool. Each fiber pair of each fabric port along strand 700 can be connected to any arbitrary fiber pair of another fabric port along strand 700. Since this is a reconfigurable physical path, wavelength division multiplexing (WDM) such as coarse wavelength division multiplexing (CWDM) can be used for each fiber egress, if needed. Bidirectional usage of the OCS can be implemented, for example, using circulators. Strand 700 allows independent configuration of bandwidth within the pool without stranding any port capacity.

Figure 8:
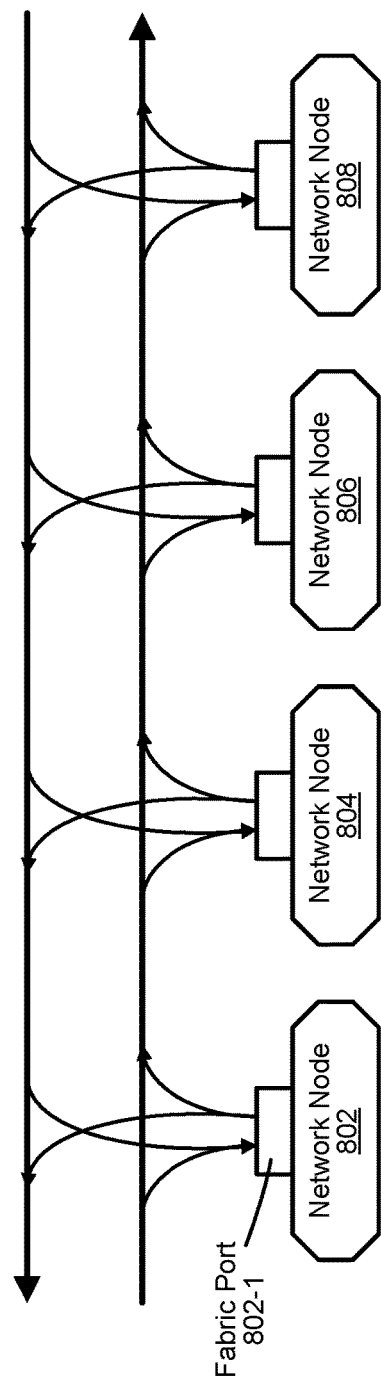
FIG. 8 illustrates a third example implementation of a strand, according to certain aspects of the disclosure.

FIG. 8 illustrates a third example implementation of a strand in which reconfigurable multipoint optical connections are implemented with optical couplers and splitters to merge and split the optical wavelengths along the strand. In the example shown, strand 800 connects four network nodes 802, 804, 806, and 808. Although only one fabric port 802-1 is shown for network node 802, each network node may include multiple fabric ports to connect to other strands. Strand 800 involves using a cascade of T-couplers to connect the fabric ports in the pool. Individual fabric ports can transmit on an exclusive set of wavelengths to avoid any downstream collisions. Coherent technology with tunable lasers can allow the receivers in each port to acquire specific wavelengths as directed by the control plane. Alternatively, tunable filters can be used with Intensity Modulated Direct Detect (IMDD) technology. To reach all fabric ports of a strand, the transmitters in strand 800 transmit in both directions. Coupler ratios can be optimized to minimize loss budget for the transceivers. In some implementations, the couplers/splitters can be part of the fabric ports themselves (e.g., to simplify cabling infrastructure).

Figure 9:
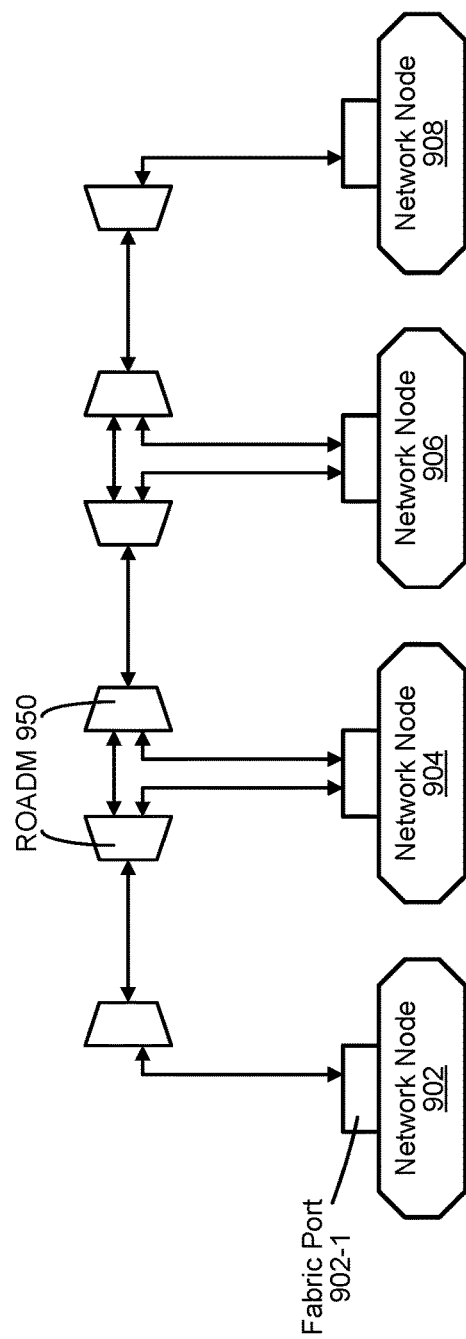
FIG. 9 illustrates a fourth example implementation of a strand, according to certain aspects of the disclosure.

FIG. 9 illustrates a fourth example implementation of a strand in which reconfigurable multipoint optical connections are implemented with reconfigurable optical add-drop multiplexers (ROADM) to add and drop optical wavelengths along the strand. In the example shown, strand 900 connects four network nodes 902, 904, 906, and 908. Although only one fabric port 902-1 is shown for network node 902, each network node may include multiple fabric ports to connect to other strands. Strand 900 involves using reconfigurable optical add/drop multiplexers (ROADMs) 950. Each ROADM 950 has access to all wavelengths on a fiber and allows for specific wavelengths to be dropped or added at a location while also allowing other wavelengths to optically pass through without requiring termination. Each ROADM 950 allows a wavelength to be dropped from one direction without continuing through, but the same wavelength can also be added for transport towards the opposite direction. Wavelength tunability is utilized in the transceivers as well as the optical network connecting the fabric ports by using wavelength selective switches in the ROADMs. Using tunable lasers and wavelength selective switches, the receivers in each fabric port can acquire specific wavelengths as directed by the control plane. Similar schemes can be implemented with Fixed OADMs as well.

Figure 10:
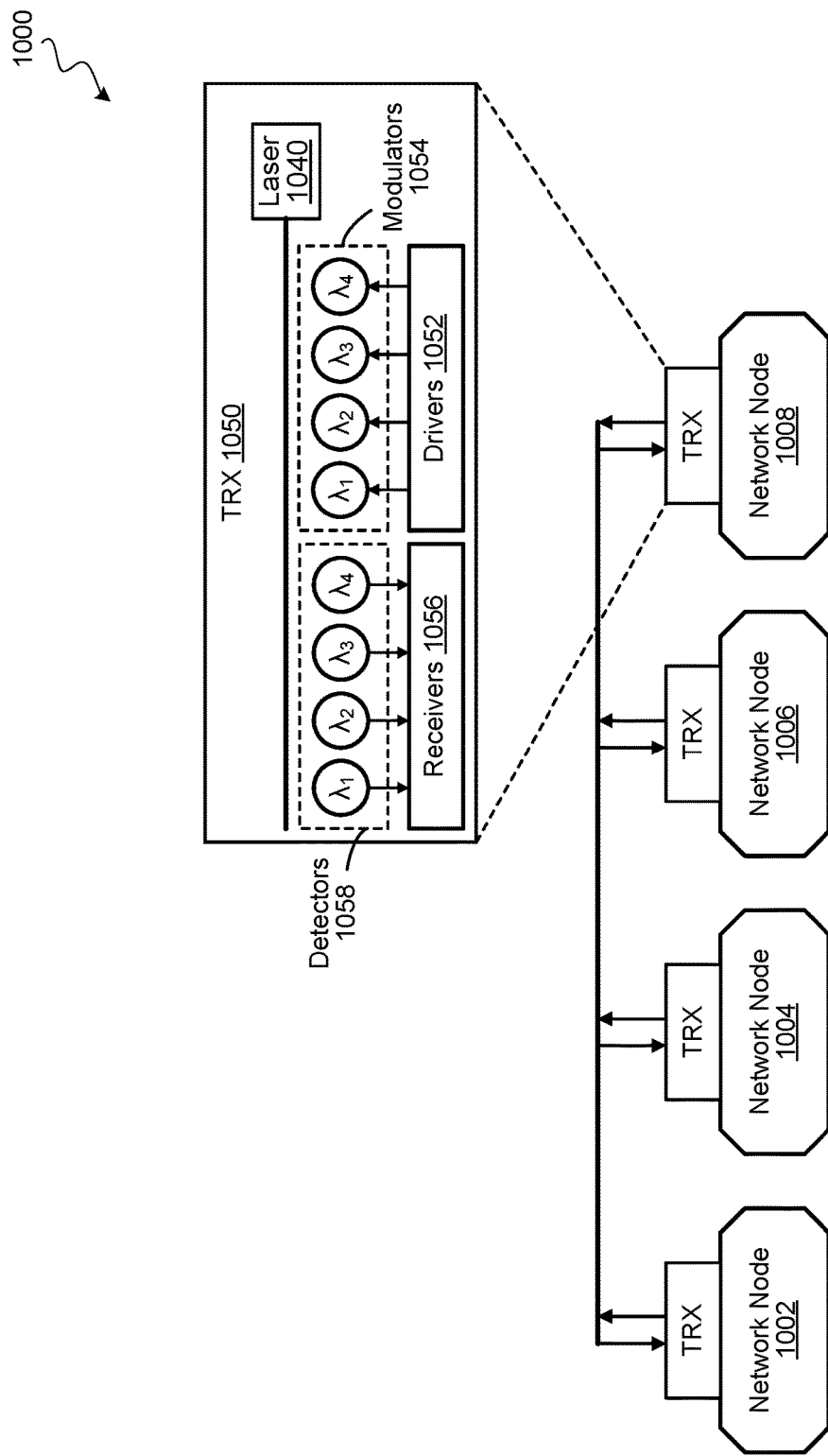
FIG. 10 illustrates a fifth example implementation of a strand, according to certain aspects of the disclosure.

FIG. 10 illustrates a fifth example implementation of a strand in which reconfigurable multipoint optical connections are implemented with silicon photonics using ring resonators to modulate and detect the optical wavelengths along the strand. In the example shown, strand 1000 connects four network nodes 1002, 1004, 1006, and 1008. In FIG. 10, a fabric port of a network node is represented as a silicon photonics (SiPho) transceiver TRX 1050 that includes ring resonators (e.g., micro-ring resonators) and laser 1040 (e.g., off-chip laser). Each ring contributes to multiplexing, demultiplexing, and modulation operations performed on the laser 1040. Each TRX 1050 may include a set of drivers 1052 to drive modulators 1054 corresponding to specific wavelengths, and a set of detectors 1058 to extract or detect specific wavelengths for a set of receivers 1056. The rings can be tuned to specific wavelengths, and optical channels at other wavelengths travel directly through with minimal loss. When a ring is resonant, the corresponding optical wavelength is channeled into the ring. As such, the receivers in each fabric port can acquire specific wavelengths as directed by the control plane.

Figure 11:
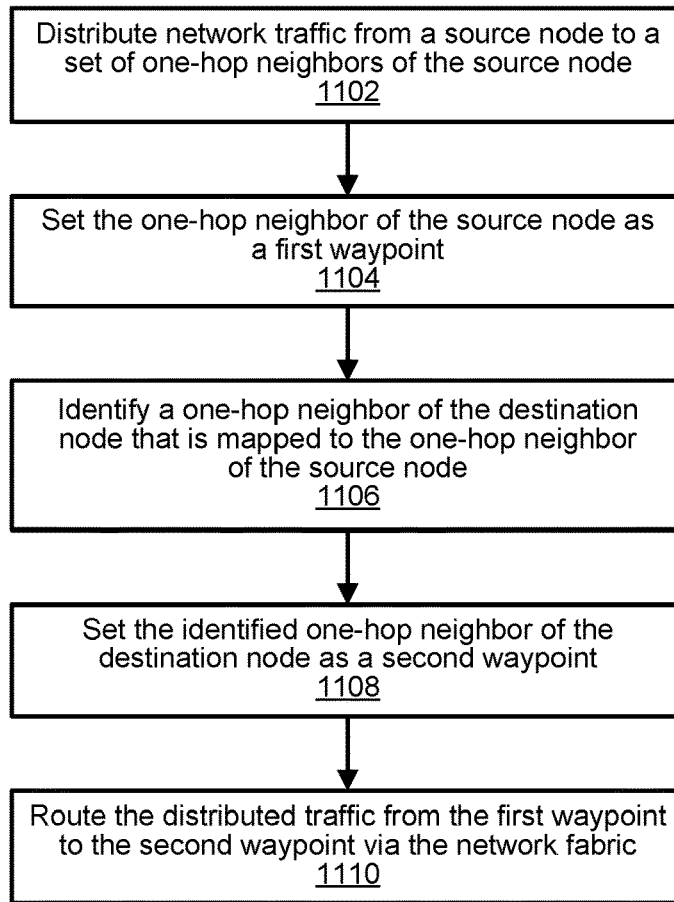
FIG. 11 illustrates a flow diagram of an example of a process for routing traffic in a network fabric, according to certain aspects of the disclosure.

FIG. 11 illustrates a flow diagram of an example of a process 1100 for routing network traffic between a source node and a destination node in a network fabric containing network nodes interconnected by strands according to harmonics that each specifies a node distance between adjacent connection points on a corresponding strand. For example, the network fabric can be a logical grid of network nodes connected according to horizontal and vertical harmonics as described herein. Process 1100 can be performed, for example, by a network node operating under the direction of a control plane (e.g., a centralized control plane for managing network traffic in the fabric). Certain aspects of process 1100 can be implemented as instructions or commands (e.g., software code, etc.) stored in a non-transitory computer-readable medium, which can be executed by a network device to perform the various operations.

Process 1100 may begin at block 1102 by the source node distributing the network traffic to a set of one-hop neighbors of the source node. The network traffic may correspond to a particular flow (e.g., identified by 5-tuple hashing). The one-hop neighbors can be the other network nodes connected to the strands that the source node is part of. Each one-hop neighbor of the source node that received the distributed traffic can forward the distributed traffic through a different path to the destination node.

At block 1104, the one-hop neighbor of the source node is set as a first waypoint for the traffic distributed to this one-hop neighbor. At block 1106, a one-hop neighbor of the destination node that is associated with the one-hop neighbor of the source node is identified. For example, the one-hop neighbor of the destination node can be identified by looking up the source and destination nodes in a mapping table that contains a one-to-one mapping of the nodes' one-hop neighbors. The one-to-one mapping or association between nodes can be configured, for example, by a control plane. The mapping can be assigned randomly, or the mapping can be selected based on certain metric such as the shortest path or lowest utilization. At block 1108, the identified one-hop neighbor of the destination node can be set as a second waypoint for the distributed traffic.

At block 1110, the distributed traffic is routed from the first waypoint to the second waypoint via the network fabric. In implementations in which each link between connection points on each strand in the network fabric has a fixed bandwidth capacity, the routing between the two waypoints can be performed using equal cost multipath routing (ECMP). In implementations in which each link between connection points on each strand in the network fabric has a dynamically adjustable bandwidth capacity (e.g., each strand can support multiple channels using reconfigurable multipoint optics), the routing between the two waypoints can be performed using weighted cost multipath routing (WCMP).

In some implementations, the routing scheme can be selected based on the traffic demand from the source node to the destination node. For traffic demand below a threshold traffic limit (e.g., 10 Gbps), ECMP can be selected as the routing scheme. For traffic demand at or above the threshold, WCMP can be selected as the routing scheme. WCMP routing can be more computationally intensive, and thus WCMP can be reserved for higher traffic loads when path optimizations have more impact.

WCMP may utilize an optimizer to determine the amount of traffic (e.g., portion of the traffic demand) to carry on each path, and/or the channel allocation on links between connection points on each strand. The optimizer can be implemented, for example, in a control plane using linear programming solver to find an optimal solution for an objective function (e.g., minimize or maximize the objective function). Depending on the objective function, a mixed integer linear programming (MILP) solver or an integer linear programming (ILP) solver can be used. The inputs to the optimizer may include a traffic demand matrix containing traffic information between each pair of network nodes in the network fabric, connection topology including the harmonics of the network fabric, and valid paths for each pair of network nodes in the network fabric. The inputs to the optimizer may also include the maximum number of channels supported per strand, and bandwidth capacity per channel.

The traffic information included in the traffic demand matrix can be obtained from the network nodes in the network fabric. For example, each network node may periodically provide the control plane with the amount of ingress traffic received from other network nodes and egress traffic sent to other network nodes over a time interval. For example, the ingress and egress traffic information of the previous hour can be used as an indication of the traffic demand for the next hour. The set of valid paths for a pair of network nodes considered by the optimizer may include edge disjointed paths, node-disjointed paths, and/or shortest paths.

The set of constraints of the optimizer may include a traffic constraint indicating that all traffic demands in the traffic demand matrix are routed. The set of constraints may also include a channel allocation constraint at the fiber/strand level or fabric port level. The fiber/strand level constraint may indicate the total number of channels on each fiber/strand is equal to the maximum allowable number of channels per strand. The port level constraint may indicate that the total inbound and outbound channels at a port is set at the maximum allowable number of channels. The set of constraints may further include a capacity constraint indicating that the total traffic carried by each link for all paths that the link is part of is less than the capacity allocated to the link.

The objective function of the optimizer can be based on one or more of utilization, excess capacity, latency, or redundancy of links between the connection points. By way of example, the objective function can be to minimize a maximum utilization on each link between the connection points, maximize a minimum excess capacity or headroom on each link between the connection points, minimize the maximum latency (e.g., number of hops), or combinations thereof. The objective function can be tailored based on the network performance priorities (e.g., capacity over latency, or vice versa) and/or the available computational resources of the control plane. The optimizer can be executed periodically (e.g., every hour) based on updated traffic demand matrix providing the up-to-date traffic patterns between the network nodes in the network fabric.

Figure 12:
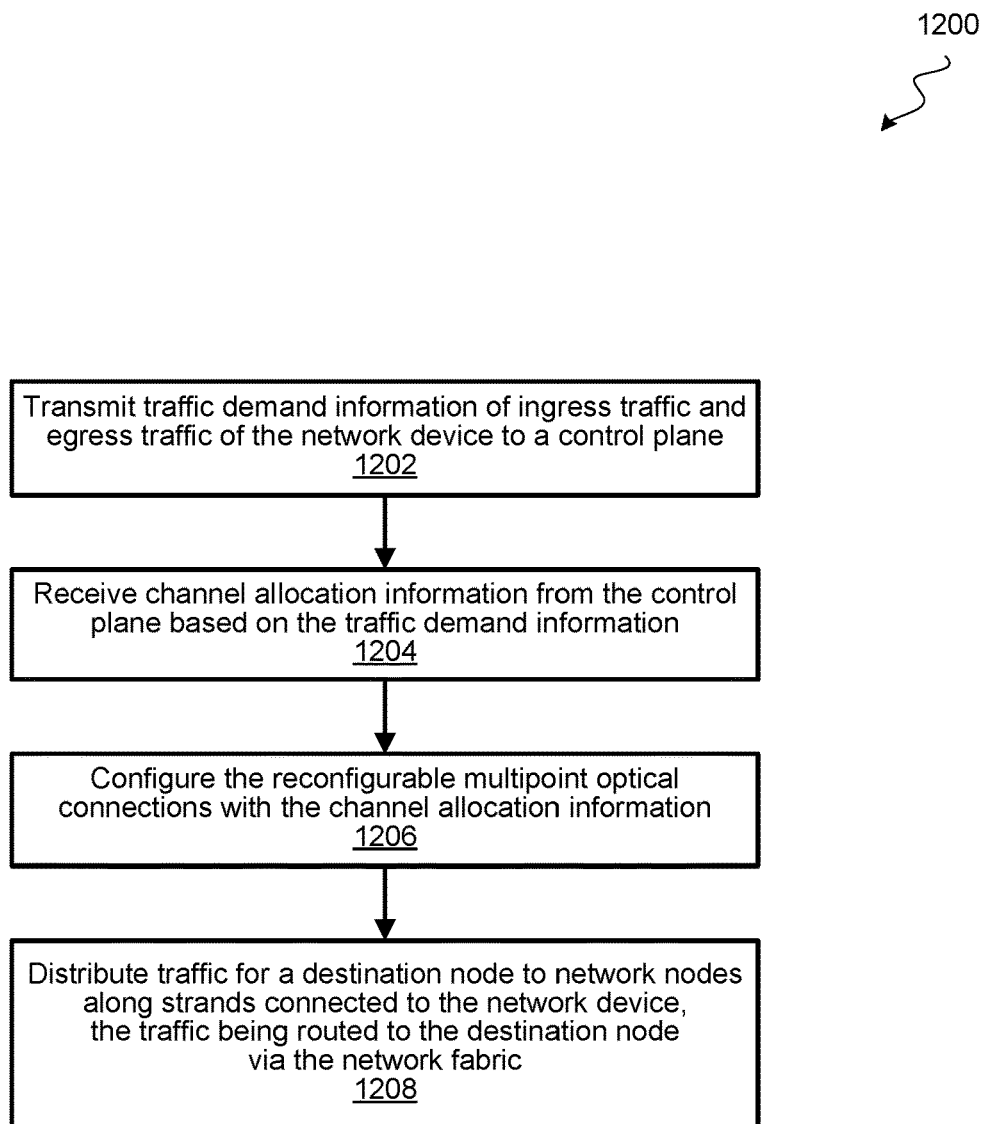
FIG. 12 illustrates a flow diagram of an example of a process for performing communications in a network fabric, according to certain aspects of the disclosure.

FIG. 12 illustrates a flow diagram of an example of a process 1200 for performing communications in a network fabric containing network nodes. The network nodes can be interconnected by strands according to harmonics that each specifies a node distance between adjacent connection points on a corresponding strand. For example, the network fabric can be a logical grid of network nodes connected according to horizontal and vertical harmonics as described herein. Process 1200 can be performed, for example, by a network device operating as a network node in the network fabric. Certain aspects of process 1200 can be implemented as instructions or commands (e.g., software code, etc.) stored in a non-transitory computer-readable medium, which can be executed by a network device to perform the various operations.

The network device may include connection ports providing a bandwidth capacity for the network device. The connection ports may include a set of fabric ports operable to connect with respective strands. Each strand can be implemented, for example, using multipoint optical connections. In some implementations, the multipoint optical connections can be reconfiguration multipoint optical connections that support multiple channels to allow dynamic channel reallocation between connection points on the strand.

Process 1200 may begin at block 1202 by transmitting traffic demand information of ingress traffic and egress traffic of the network device to a control plane that manages the network fabric (e.g., a centralized control plane). The ingress/egress traffic information may include bandwidth usage of the network node collected over a time interval, and the ingress/egress traffic information can be transmitted to the control plane periodically. The control plane may use the ingress/egress traffic information to predict or approximate the traffic demand, and a traffic demand matrix can be generated from the traffic information collected from the network nodes of the network fabric.

At block 1204, the network device may receive channel allocation information from the control plane based on the traffic demand information. For example, the control plane may execute an optimizer to determine the traffic distribution (e.g., amount of traffic or portion of the traffic demand to carry on each path), and/or the channel allocation on links between connection points on each strand. The channel allocation information received by the network device may include the channel allocation on links connected to the fabric ports of the network device.

At block 1206, the reconfigurable multipoint optical connections can be configured with the channel allocation information received form the control plane. For example, the network device may adjust, enable, or disable the wavelength used by each fabric port in accordance with the channel allocation information. Depending on the particular implementation, configuring the multipoint optical connections may include configuring the optical transceiver coupled to the fabric port and/or configuring an external component such as an optical circuit switch.

At block 1208, the network device can distribute traffic for a destination node to network nodes along strands connected to the network device. The traffic can be distributed in a manner as determined by the control plane. The distributed traffic can then be routed to the destination node via the network fabric using the techniques disclosed herein. For example, the one-hop neighbor of the network device and the one-hop neighbor of the destination node that is mapped to the one-hop neighbor of the network device can be set as two waypoints, and the routing between the waypoints can be performed using ECMP or WCMP (e.g., based on traffic demand).

Figure 13:
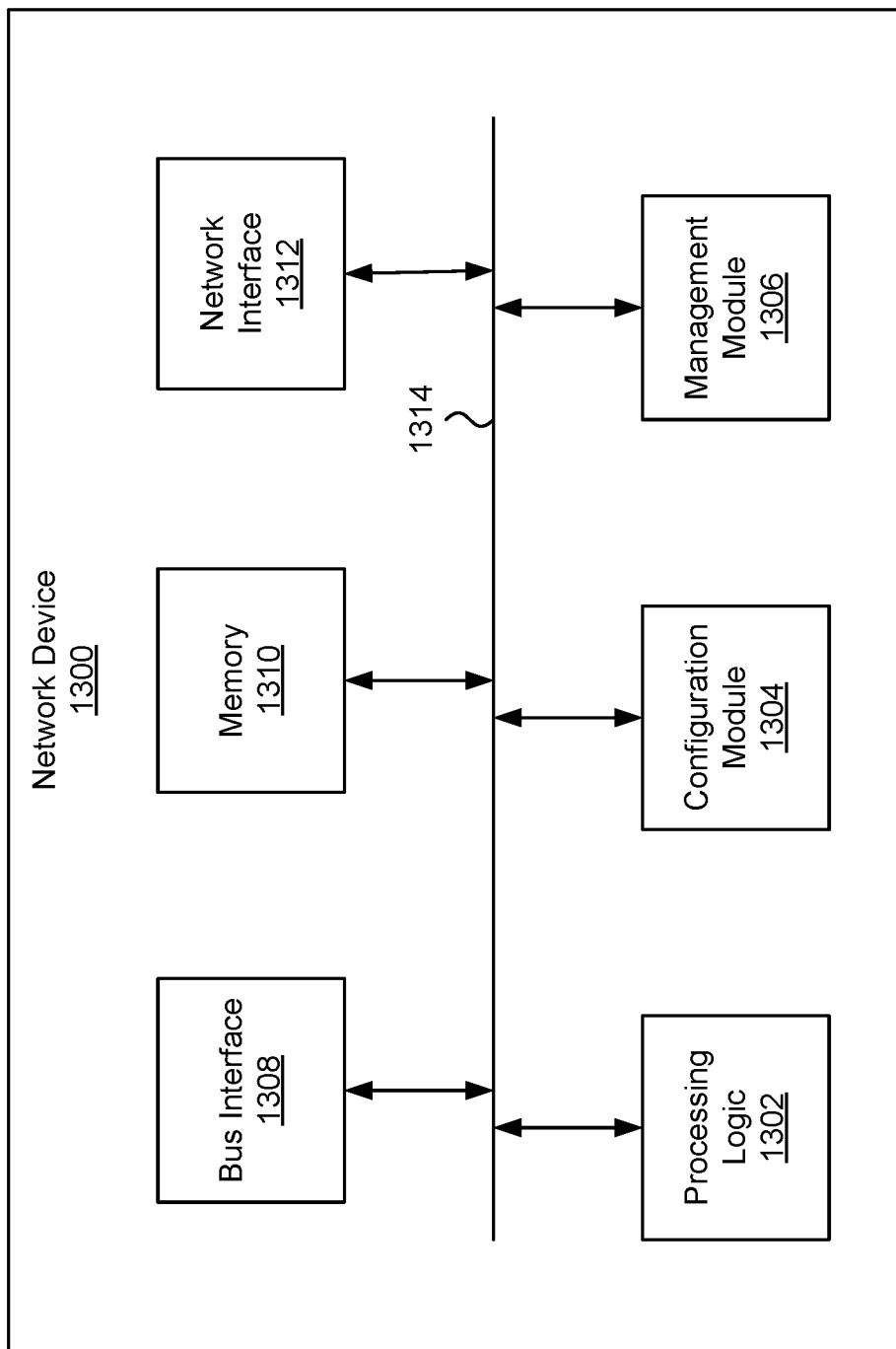
FIG. 13 illustrates an example of a network device, according to certain aspects of the disclosure.

FIG. 13 illustrates an example of a network device 1300. Functionality and/or several components of the network device 1300 may be used without limitation with other embodiments disclosed elsewhere in this disclosure, without limitations. Network device 1300 can be used, for example, as a network node in a network fabric. A network device 1300 may facilitate processing of packets and/or forwarding of packets from the network device 1300 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1300 may be the recipient and/or generator of packets. In some implementations, the network device 1300 may modify the contents of the packet before forwarding the packet to another device. The network device 1300 may be a peripheral device coupled to another computer device, a switch, a router or any other suitable device enabled for receiving and forwarding packets.

In one example, the network device 1300 may include processing logic 1302, a configuration module 1304, a management module 1306, a bus interface module 1308, memory 1310, and a network interface module 1312. These modules may be hardware modules, software modules, or a combination of hardware and software. In certain instances, modules may be interchangeably used with components or engines, without deviating from the scope of the disclosure. The network device 1300 may include additional modules, not illustrated here such as other components of a network node described herein (e.g., fabric ports, server ports, etc.). In some implementations, the network device 1300 may include fewer modules. In some implementations, one or more of the modules may be combined into one module. One or more of the modules may be in communication with each other over a communication channel 1314. The communication channel 1314 may include one or more busses, meshes, matrices, fabrics, a combination of these communication channels, or some other suitable communication channel.

The processing logic 1302 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1302 may include processors developed by ARMR, MIPSR, AMD R, IntelR, QualcommR, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1302 may be stored on a computer-readable storage medium, for example, in the form of a computer program. The computer-readable storage medium may be non-transitory. In some cases, the computer-readable medium may be part of the memory 1310.

The memory 1310 may include either volatile or non-volatile, or both volatile and non-volatile types of memory. The memory 1310 may, for example, include random access memory (RAM), read only memory (ROM), Electrically Erasable Programmable Read-Only Memory (EEPROM), flash memory, and/or some other suitable storage media. In some cases, some or all of the memory 1310 may be internal to the network device 1300, while in other cases some or all of the memory may be external to the network device 1300. The memory 1310 may store an operating system comprising executable instructions that, when executed by the processing logic 1302, provides the execution environment for executing instructions providing networking functionality for the network device 1300. The memory may also store and maintain several data structures and routing tables for facilitating the functionality of the network device 1300.

In some implementations, the configuration module 1304 may include one or more configuration registers. Configuration registers may control the operations of the network device 1300. In some implementations, one or more bits in the configuration register can represent certain capabilities of the network device 1300. Configuration registers may be programmed by instructions executing in the processing logic 1302, and/or by an external entity, such as a host device, an operating system executing on a host device, and/or a remote device. The configuration module 1304 may further include hardware and/or software that control the operations of the network device 1300.

In some implementations, the management module 1306 may be configured to manage different components of the network device 1300. In some cases, the management module 1306 may configure one or more bits in one or more configuration registers at power up, to enable or disable certain capabilities of the network device 1300. In certain implementations, the management module 1306 may use processing resources from the processing logic 1302. In other implementations, the management module 1306 may have processing logic similar to the processing logic 1302, but segmented away or implemented on a different power plane than the processing logic 1302.

The bus interface module 1308 may enable communication with external entities, such as a host device and/or other components in a computing system, over an external communication medium. The bus interface module 1308 may include a physical interface for connecting to a cable, socket, port, or other connection to the external communication medium. The bus interface module 1308 may further include hardware and/or software to manage incoming and outgoing transactions. The bus interface module 1308 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1308 may include the physical layer for any of these bus protocols, including a connector, power management, and error handling, among other things. In some implementations, the network device 1300 may include multiple bus interface modules for communicating with multiple external entities. These multiple bus interface modules may implement the same local bus protocol, different local bus protocols, or a combination of the same and different bus protocols.

The network interface module 1312 may include hardware and/or software for communicating with a network. This network interface module 1312 may, for example, include physical connectors or physical ports for wired connection to a network, and/or antennas for wireless communication to a network. The network interface module 1312 may further include hardware and/or software configured to implement a network protocol stack. The network interface module 1312 may communicate with the network using a network protocol, such as for example TCP/IP, Infiniband, RoCE, Institute of Electrical and Electronics Engineers (IEEE) 802.13 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1300 may include multiple network interface modules, each configured to communicate with a different network. For example, in these implementations, the network device 1300 may include a network interface module for communicating with a wired Ethernet network, a wireless 802.11 network, a cellular network, an Infiniband network, etc.

The various components and modules of the network device 1300, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 13, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for routing network traffic between a source node and a destination node in a network fabric having a logical grid of network nodes interconnected by strands according to harmonics of the network fabric that each specifies a node distance between adjacent connection points on a corresponding strand, the method comprising:
selecting a routing scheme based on traffic demand from the source node to the destination node, the routing scheme selected between equal-cost multipath (ECMP) routing for the traffic demand below a threshold and weighted-cost multipath (WCMP) routing for the traffic demand at or above the threshold;
distributing the network traffic from the source node to a set of one-hop neighbors of the source node; and
for each one-hop neighbor of the source node in the set of one-hop neighbors of the source node:
setting the one-hop neighbor of the source node as a first waypoint;
identifying a one-hop neighbor of the destination node that is mapped to the one-hop neighbor of the source node;
setting the identified one-hop neighbor of the destination node as a second waypoint; and
routing the distributed network traffic from the first waypoint to the second waypoint according to the selected routing scheme via the network fabric.

2. The computer-implemented method of claim 1, wherein each strand in the network fabric supports up to a maximum number of channels, and wherein the WCMP routing is performed using an optimizer to determine channel allocation on links between connection points on each strand, and a portion of the traffic demand carried on each path.

3. The computer-implemented method of claim 2, wherein inputs to the optimizer include a traffic demand matrix containing traffic information between each pair of network nodes in the network fabric, connection topology including the harmonics of the network fabric, valid paths for the each pair of network nodes in the network fabric, the maximum number of channels supported per strand, and bandwidth capacity per channel.

4. The computer-implemented method of claim 3, wherein an objective function of the optimizer is to minimize a maximum utilization or maximize a minimum excess capacity on each link between the connection points.

5. A computer-implemented method for routing network traffic between a source node and a destination node in a network fabric containing network nodes interconnected by strands according to harmonics of the network fabric that each specifies a node distance between adjacent connection points on a corresponding strand, the computer-implemented method comprising:
distributing the network traffic from the source node to a set of one-hop neighbors of the source node; and
for each one-hop neighbor of the source node in the set of one-hop neighbors of the source node:
setting the one-hop neighbor of the source node as a first waypoint;
identifying a one-hop neighbor of the destination node that is mapped to the one-hop neighbor of the source node;
setting the identified one-hop neighbor of the destination node as a second waypoint; and
routing the distributed network traffic from the first waypoint to the second waypoint via the network fabric.

6. The computer-implemented method of claim 5, wherein routing the distributed network traffic is performed using equal-cost multipath (ECMP) routing.

7. The computer-implemented method of claim 6, wherein each link between connection points on each strand in the network fabric has a fixed bandwidth capacity.

8. The computer-implemented method of claim 6, wherein a traffic demand between the source node and the destination node is below a threshold traffic limit used for selecting different routing schemes.

9. The computer-implemented method of claim 5, wherein routing the distributed network traffic is performed using weighted-cost multipath (WCMP) routing.

10. The computer-implemented method of claim 9, wherein each link between connection points on each strand in the network fabric has a dynamically adjustable bandwidth capacity.

11. The computer-implemented method of claim 9, wherein a traffic demand between the source node and the destination node is at or above a threshold traffic limit used for selecting different routing schemes.

12. The computer-implemented method of claim 5, wherein routing the distributed network traffic is performed by an optimizer that determines an amount of traffic to carry on each path, the optimizer receiving a set of inputs including:
a traffic demand matrix containing traffic information between each pair of network nodes in the network fabric;
connection topology including the harmonics of the network fabric; and
valid paths for the each pair of network nodes in the network fabric.

13. The computer-implemented method of claim 12,
wherein the set of inputs to the optimizer further includes a maximum number of channels supported per strand and bandwidth capacity per channel, and
wherein the optimizer further determines channel allocation on links between connection points on each strand.

14. The computer-implemented method of claim 13, wherein an objective function of the optimizer is based on one or more of utilization, excess capacity, latency, or redundancy of links between the connection points.

15. The computer-implemented method of claim 12, wherein the optimizer is executed periodically based on an updated traffic demand matrix.

16. The computer-implemented method of claim 5, wherein the one-hop neighbor of the destination node mapped to the one-hop neighbor of the source node is identified by looking up the source and destination nodes in a mapping table.

17. A non-transitory computer-readable medium storing code that, when executed by one or more processors, causes the one or more processors to perform operations for routing network traffic between a source node and a destination node in a network fabric containing network nodes interconnected by strands according to harmonics of the network fabric that each specifies a node distance between adjacent connection points on a corresponding strand, the operations including:
distributing the network traffic from the source node to a set of one-hop neighbors of the source node; and for each one-hop neighbor of the source node in the set of one-hop neighbors of the source node:
- setting the one-hop neighbor of the source node as a first waypoint;
- identifying a one-hop neighbor of the destination node that is mapped to the one-hop neighbor of the source node;
- setting the identified one-hop neighbor of the destination node as a second waypoint; and
- routing the distributed network traffic from the first waypoint to the second waypoint via the network fabric.

18. The non-transitory computer-readable medium of claim 17, wherein routing the distributed network traffic is performed using equal-cost multipath (ECMP) routing.

19. The non-transitory computer-readable medium of claim 17, wherein routing the distributed network traffic is performed using weighted-cost multipath (WCMP) routing.

20. The non-transitory computer-readable medium of claim 17, wherein the distributed network traffic is routed using equal-cost multipath (ECMP) routing for traffic demand between the source node and the destination node being below a threshold, and weighted-cost multipath (WCMP) routing for the traffic demand being at or above the threshold.

* * * * *